M. A. BARBER.
PIPE UNION.
APPLICATION FILED AUG. 9, 1918.
1,347,834.
Patented July 27, 1920.
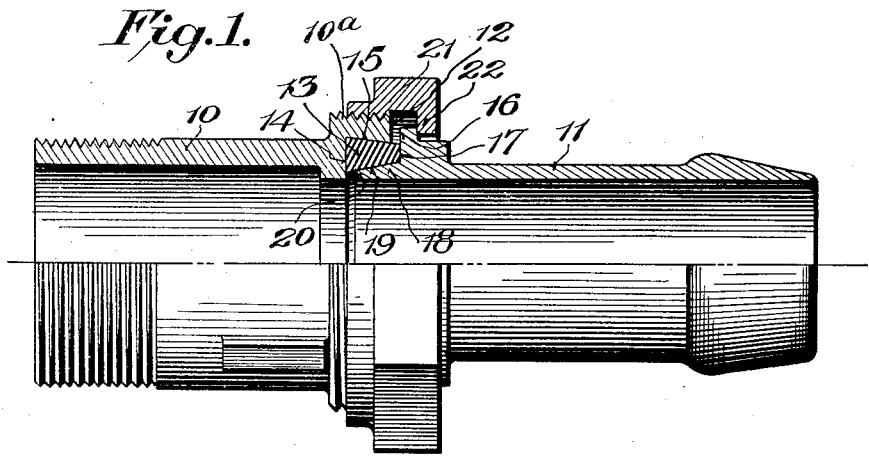
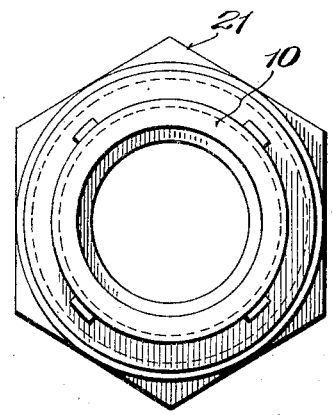
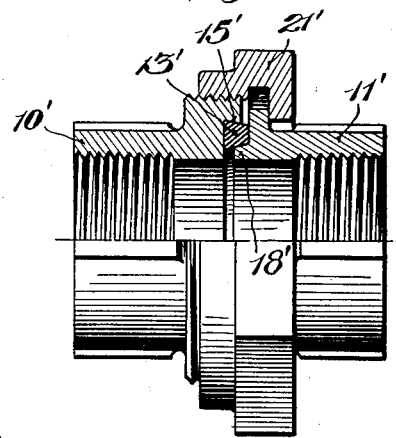
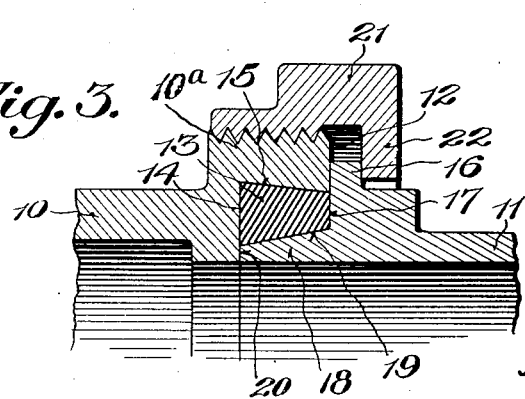
Inventor
Martin A. Barber
By L. A. Stanley
Attorney

UNITED STATES PATENT OFFICE.

MARTIN A. BARBER, OF CLEVELAND, OHIO, ASSIGNOR TO THE AMERICAN AUTOMATIC CONNECTOR COMPANY, OF CLEVELAND, OHIO, A CORPORATION OF OHIO.

PIPE-UNION.

1,347,834.  Specification of Letters Patent.  Patented July 27, 1920.

Application filed August 9, 1918. Serial No. 249,182.

*To all whom it may concern:*

Be it known that I, MARTIN A. BARBER, a citizen of the United States, residing at Cleveland, in the county of Cuyahoga and State of Ohio, have invented certain new and useful Improvements in Pipe-Unions, of which the following is a specification.

The present invention relates to pipe unions or couplings. The objects of the invention are to provide an exceedingly simple and dependable coupling which will connect two tubular members in a substantially leakproof and rigid manner. Other objects and features of novelty will be apparent from the description taken in connection with the drawings in which:

Figure 1 is an elevation half in section of the present invention as embodied in a steam union;

Fig. 2 is an end elevation of the parts as seen from the left in Fig. 1;

Fig. 3 is an enlarged view of a portion of the union shown in Fig. 1 illustrating the position of the parts when the tubular members are drawn up into end contact with each other; and Fig. 4 is an elevation half in section illustrating the invention as embodied in a standard pipe union.

Referring to the drawings and more particularly to Figs. 1 and 3 inclusive the reference character 10 indicates one of the tubular members of the union and as shown has the enlarged cylindrical portion $10^a$ at one end thereof, this cylindrical portion having the annular end surface 12 which is shown substantially in a plane perpendicular to the axis of the member. The interior of the portion $10^a$ is formed with an annular recess for a packing ring 13. As shown this recess is bounded by a bottom surface 14 which lies in a plane substantially perpendicular to the axis of the member 10; and also by a surface of generation 15 which intersects the perpendicular surface 14. As shown the surface 15 is conical and tapers from the bottom surface 14 toward the mouth of the recess.

A second tubular member 11 which is adapted to be connected by means of the union to the first member has a radial flange or lip 16 at one end, this flange having an annular end surface 17 which is substantially perpendicular to the axis of the member. This end is also formed with the centrally arranged boss 18 the outer surface 19 of which is a surface of generation and intersects the perpendicular surface 17. As shown, the surface 19 is conical and tapers slightly from its base where it joins the surface 17 to the end of the boss. The length of this boss is made equal to the axial depth of the recess in the member 10 so that when the two tubular members are drawn together the end surface 20 of the boss and the surface 17 will abut the surfaces 14 and 12 respectively on the member 10, this position of the parts being illustrated in Fig. 3.

A packing ring 13, of suitable material, is arranged in the seat provided by the end recess in the member 10, the axial length of this ring being a little greater than the depth of the recess whereby when the two tubular members of the union are drawn together the end surface 17 on one member in coöperation with the bottom 14 of the recess in the other will compress the packing in an axial direction. Furthermore, because of the inclined surface 19 of the boss the packing ring also will be compressed in a radial direction, that is, in a direction at right angles to the direction mentioned above. The usual means may be provided for drawing the members together, and as shown this comprises a nut 21 internally threaded on the cylindrical end portion $10^a$ and having an inwardly extending lip or flange 22 engaging the side of the flange 16, whereby when this nut is screwed on to the member 10 the flange 22 acting against the flange 16 on the member 11 will draw the two members together, thereby compressing the gasket in two directions. Preferably, the gasket is of such size and material that it will not offer such a resistance as to prevent an end to end contact of the end surfaces of the two members in the manner described above and illustrated in Fig. 3. Because of this end contact of the members it will be seen that a coupling is provided which joins the members in a very rigid manner, in fact it joins them so that there is no more yielding or bending at the union than at any other point in the pipe line. Furthermore, the provision of the substantially quadrangular annular recess between the two members for the packing ring affords an arrangement whereby the packing ring is uniformly and completely compressed into contact with the bounding surfaces. Moreover it will be apparent that this construction provides a substantially fluid tight joint for the reason that the fluid in order to leak out between the members must pass along two surfaces substantially at right angles to each other. Thus, referring to Fig. 3, the fluid in order to leak through the union must pass along the bottom surface 14 and thence along the surface 15 and radially outward between the abutting end surfaces of the two members or it must pass out along the surfaces 20, 19 and 17 on the member 11. It will be observed that either of these paths of leakage is long and has the gasket tightly compressed against the same whereby practically all leakage is eliminated.

Fig. 4 illustrates the invention as embodied in a standard pipe union the only differences from the structure shown by Fig. 1 being in the proportions of the parts. An inspection of this Fig. 4 shows that the axial length of the gasket 13' and consequently of the end recess affording a seat for the same and of the boss 18' is less than in the form illustrated by Fig. 1. This is desirable for the reason that in a pipe coupling the distance which the tubular members 10' and 11' may be separated, is limited. The tubular members are adapted to be drawn into end to end contact by the nut 21', thereby providing a rigid as well as fluid tight joint.

The packing rings 13 and 13' are preferably of a yielding material and substantially the shape shown in cross section in Figs. 1 and 4. The conical surfaces 15 and 15' because of their inclination to the axis of the coupling act to retain the packing ring on its seat so that it will not fall out when the union is disconnected.

Although the preferred form of the union has been described in detail, it is to be understood that the invention is not limited to the details shown but include other forms that come within the scope of the appended claims.

Having thus described the invention what is claimed as new and desired to be secured by Letters Patent is:

1. A pipe coupling or union including in combination, a tubular member having an interior annular recess forming a seat for a packing in one end, said seat comprising a surface substantially in a plane perpendicular to the axis of the member and a surface of generation concentric with the said axis intersecting said first surface, a ring of packing on said seat, a second tubular member having a boss at one end the outer surface of which is a surface of generation concentric to the axis of the second member and of smaller diameter than the first mentioned surface of generation adapted to engage the inner periphery of said packing ring, said second member having an end surface at the base of the boss substantially perpendicular to its axis adapted to engage the side of said packing ring and means for drawing said members together thereby compressing the packing between said perpendicular surfaces and between said surfaces of generation.

2. A pipe coupling or union including in combination, a tubular member having an interior annular recess forming a seat for a packing ring in one end thereof, said seat comprising a surface substantially perpendicular to the axis of the member and a surface of generation concentric with said axis and intersecting said perpendicular surface, a ring of packing on said seat having a side and its outer periphery in contact with said surface, a second tubular member formed with an annular surface at one end thereof perpendicular to the axis of said member and a conical boss of smaller diameter than said surface of generation, said boss and annular surface adapted to engage the inner periphery and a side respectively of said packing ring, and means for drawing said members together thereby compressing the packing between said perpendicular surfaces and between the boss and surface of generation.

3. A pipe coupling or union including in combination, a tubular member having an interior annular recess forming a seat for a packing ring in one end thereof, a packing ring on said seat projecting from the end of said member, a second tubular member having a conical boss at one end of larger diameter than the interior periphery of said packing ring and adapted to engage said interior periphery, and means for drawing said members together to thereby compress said packing ring.

4. A pipe coupling or union including in combination, a tubular member having an annular recess forming a seat for a packing ring at one end thereof, said seat comprising a surface substantially perpendicular to the axis of the member and a conical surface intersecting the first surface, a packing ring on said seat projecting from the end of said member, a second tubular member having a portion at one end adapted to engage one of the longitudinal surfaces of said ring, and means for drawing said members together to thereby compress said ring.

5. A pipe coupling or union, including in combination, a tubular member having an annular recess at one end forming a seat, said seat comprising a bottom surface substantially perpendicular to the axis of the member and a surface of generation concentric to said axis intersecting the first surface, a packing ring in said recess, a second tubular member having an annular end surface substantially perpendicular to the axis thereof and a projecting portion equal in length to the axial depth of the recess in the first member and means for drawing the members together whereby the ring is compressed and the end of the projecting portion and the annular end surface on the second member abut the bottom of the recess and the end surface respectively of the first member thereby forming a tight and rigid connection.

6. A pipe coupling including in combination, two tubular members each having end to end contact with the other on two annular surfaces, the adjoining ends of said members between said surfaces being constructed and arranged with two surfaces of generation to form a closed annular recess substantially quadrangular in cross section and having two sides on one member and two on the other, means for drawing said members together, and a packing ring in said recess compressed by the drawing together of the members.

7. A pipe coupling including in combination, two tubular members each having end to end contact with the other on two annular surfaces, the adjoining ends of said members between said surfaces being constructed and arranged to form a closed annular recess substantially trapezoidal in cross section, means for drawing said members together, and a packing ring in said recess compressed in two directions by the drawing together of the members.

8. A pipe coupling or union including in combination, a tubular member having an interior annular recess forming a seat for a packing ring in one end thereof, said seat being tapered inwardly toward the axis of the tubular member toward the end of said tubular member, a packing ring on said seat projecting from the end of said tubular member, a second tubular member having a conical boss at one end, of larger diameter than the interior periphery of said packing ring and adapted to engage said interior periphery, and means for drawing said members together to thereby compress said packing ring.

9. A pipe coupling or union comprising in combination, a tubular member having a flanged portion at its end of greater diameter than the main body portion of the tube, the inner surface of said flange being tapered toward the end of the flange, a second tubular member having a tapered surface near its end angularly disposed with respect to the tapered surface of the flange, each of said tubular members having an opposed packing ring engaging surface adjacent to its tapered surface, and a packing ring disposed between said oppositely tapered surfaces and between said opposed ring engaging surfaces, and means for forcing said tubular members together to compress said packing ring.

10. A pipe coupling or union including in combination a tubular member having an annular seat for a packing ring, a packing ring mounted on said seat, and a second tubular member having two surfaces at an angle to each other and formed to engage one of the ends and one of the side walls of said packing ring and compress it both longitudinally and laterally, and means for forcing said members toward each other.

11. A pipe union or coupling including in combination a tubular member having an annular recess, a packing ring seated in said recess and having a conical face, a second tubular member having a conical surface adapted to engage the conical face of the packing ring and having an abrupt laterally extending shoulder adapted to engage the end of the packing ring, and means for drawing said tubular members toward each other to compress the packing ring.

12. A pipe union or coupling including in combination a tubular member having an interior annular recess, a packing ring seated in said recess and having a conical interior face, a second tubular member having a conical boss adapted to engage the interior of the packing ring and having an abrupt outwardly extending shoulder adapted to engage the end of the packing ring, and means for drawing said tubular members toward each other to compress the packing ring.

13. A pipe union or coupling including in combination a tubular member having an annular recess, a packing ring seated in said recess, a second tubular member having a conical surface adapted to engage a side wall of the packing ring and having laterally projecting surfaces at the ends of the conical surface, one extending inwardly and the other outwardly, said first mentioned member having lateral surfaces complementary to those of the other member, and means for drawing said members together.

14. A pipe union or coupling including in combination a tubular member having an annular recess, a packing ring seated in said recess, a second tubular member having a conical surface adapted to engage a side wall of the packing ring and having two laterally projecting surfaces at the ends of the conical surface, one extending inwardly and the other outwardly, said first mentioned member having two lateral surfaces complementary to those of the other member, and means for holding the lateral surfaces of said members in snug mutual engagement.

15. A pipe union or coupling comprising two members, each having a longitudinal portion and a laterally extending portion, one of the longitudinal portions being conical, surfaces at the ends of the longitudinal portions of each member adapted to abut corresponding surfaces of the other member and thereby define a closed annular space which has its inner surface and one end surface bounded by one member and its outer surface and the other end surface bounded by the other member, and a packing ring seated in said annular space.

16. A pipe union or coupling comprising two members, one having a conical end and an outwardly extending collar and the other having an annular recess, the surface at the end of the conical end and at the face of the collar being adapted to abut corresponding surfaces of the other member and thereby define a closed annular space which has its inner surface and one end surface bounded by one member and its outer surface and the other end surface bounded by the other member, and a packing ring formed to seat in said annular space and to be compressed therein.

17. A pipe union or coupling comprising a member having in its end an undercut annular recess, a packing ring seated in said recess and extending into the undercut portion thereof, whereby the ring is held from dropping off of the member, and another member formed with a surface to engage and compress the side surface of the packing ring and with a surface to engage and compress the end of the packing ring.

18. A pipe union or coupling comprising a member having in its end an undercut annular recess, a packing ring seated in said recess and extending into the undercut portion thereof, whereby the ring is held from dropping off of the member, and another member formed with a surface to engage and compress the side surface and the packing ring and with a surface to engage and compress the end of the packing ring, each of said members having lateral projecting surfaces at the opposite ends of the packing ring, two of said surfaces being adapted to meet at the outside of one end of the packing ring, and two at the inside of the other end of the ring, and means for clamping the members together with said four surfaces in engagement and with the packing ring compressed longitudinally and laterally.

In testimony whereof I have affixed my signature.

MARTIN A. BARBER.